Aug. 13, 1940.   J. A. TYTUS ET AL   2,211,183
REAMER FOR WELL PIPE JOINTS
Filed Sept. 12, 1938   4 Sheets-Sheet 1

Inventors
Jean A. Tytus,
Albert L. Stone.

Attorney.

Aug. 13, 1940.   J. A. TYTUS ET AL   2,211,183
REAMER FOR WELL PIPE JOINTS
Filed Sept. 12, 1938   4 Sheets-Sheet 2
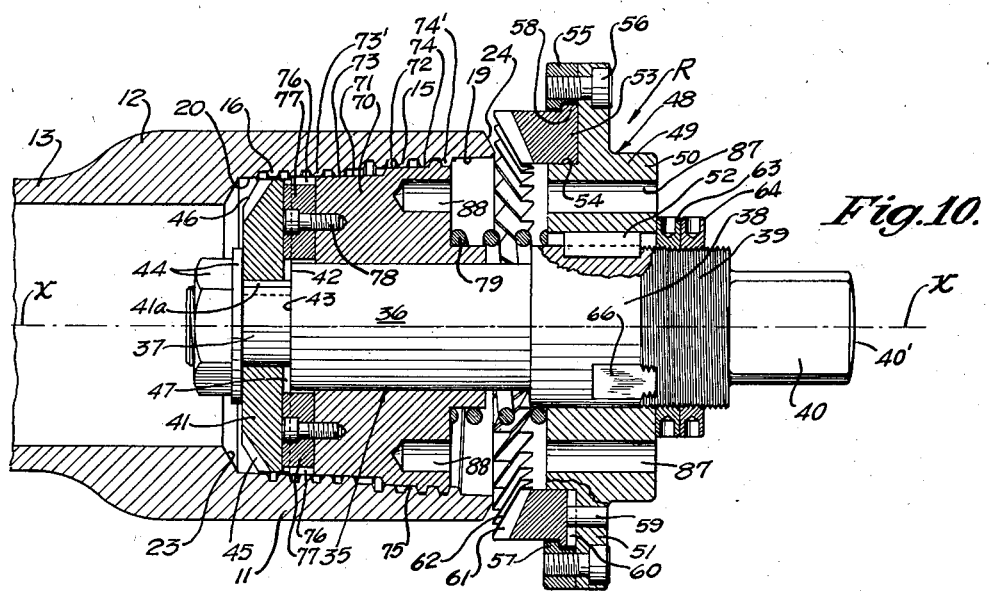
Fig.10.
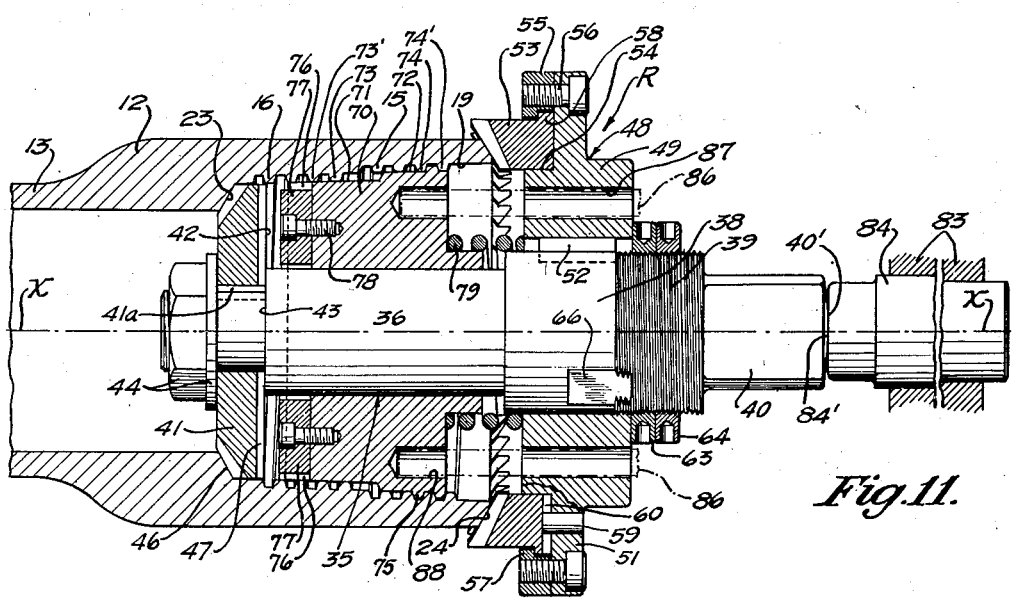
Fig.11.
Inventors
Jean A. Tytus,
Albert L. Stone.
Attorney.

Inventors
Jean A. Tytus,
Albert L. Stone.

Attorney.

Aug. 13, 1940.         J. A. TYTUS ET AL         2,211,183
              REAMER FOR WELL PIPE JOINTS
              Filed Sept. 12, 1938        4 Sheets-Sheet 4

Inventors
Jean A. Tytus,
Albert L. Stone.

Attorney.

Patented Aug. 13, 1940

2,211,183

UNITED STATES PATENT OFFICE 2,211,183

REAMER FOR WELL PIPE JOINTS

Jean A. Tytus, Redondo Beach, and Albert L. Stone, Palos Verdes Estates, Calif., assignors to Hydril Company, Los Angeles, Calif., a corporation of California Application September 12, 1938, Serial No. 229,488

31 Claims. (Cl. 90—12.5)

This invention has to do generally with reamers for well-pipe joints, and is more particularly concerned with tools adapted for reseating drill-stem joints and the like.

For purposes of illustration, we have chosen to show the tool as adapted for use in reseating joint members of flush-joint drill pipe wherein the box member of the joint is provided within the integral upset end of a pipe length, and the pin member is a double-ended tool joint. However, it will be understood this illustrative choice is in no way limitative on the invention, considered in its broader aspects. It is for this reason that in our broader claims we refer to the use of the tool in connection with seats or shoulders of "pipe," which terminology is to be taken as inclusive of pipe-coupling elements, as well as of the pipe, proper, where one of the joint parts may be integral with that pipe.

Generally, it is the object of the invention to provide a tool which will restore joints with defective seats (whether the defect arises by wear or during the manufacturing process) to conditions of full efficiency, and the accomplishment of this end with ease and dispatch. The tool is such that it may be utilized either in the shop or in the field, and it is to be noted in this connection that operation of the tool contemplates broadly relative rotation between cutting tool and work, and therefore the instant showing of means for rotating the work and holding the cutter against rotation is to be considered merely as illustrative and not as implying that the rotating and holding means may not be reversely applied.

Other objects and features of the invention will be made apparent from the following detailed description, wherein reference is made to the accompanying drawings, in which.

Figure 12:
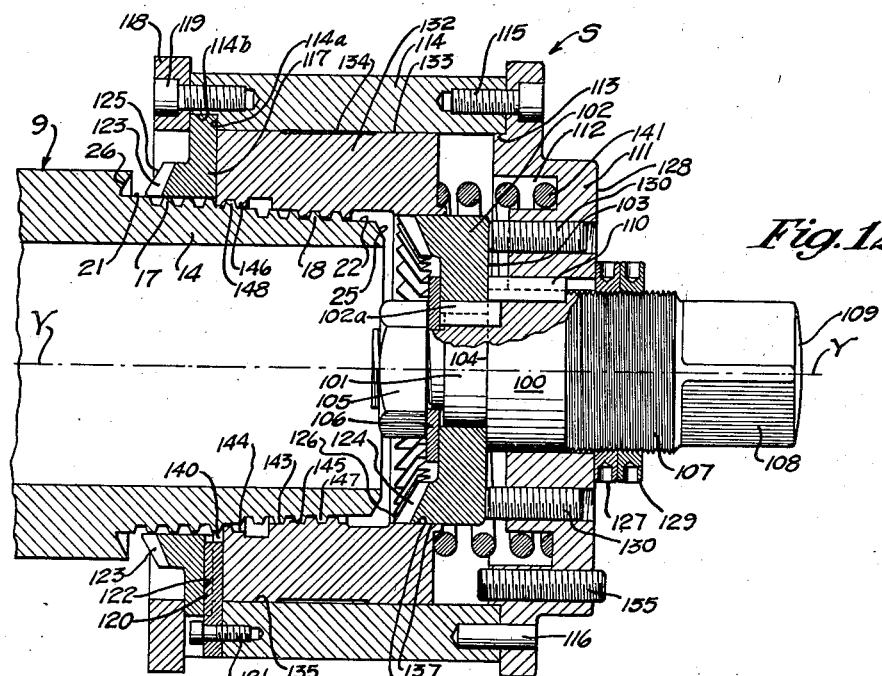
Figure 13:
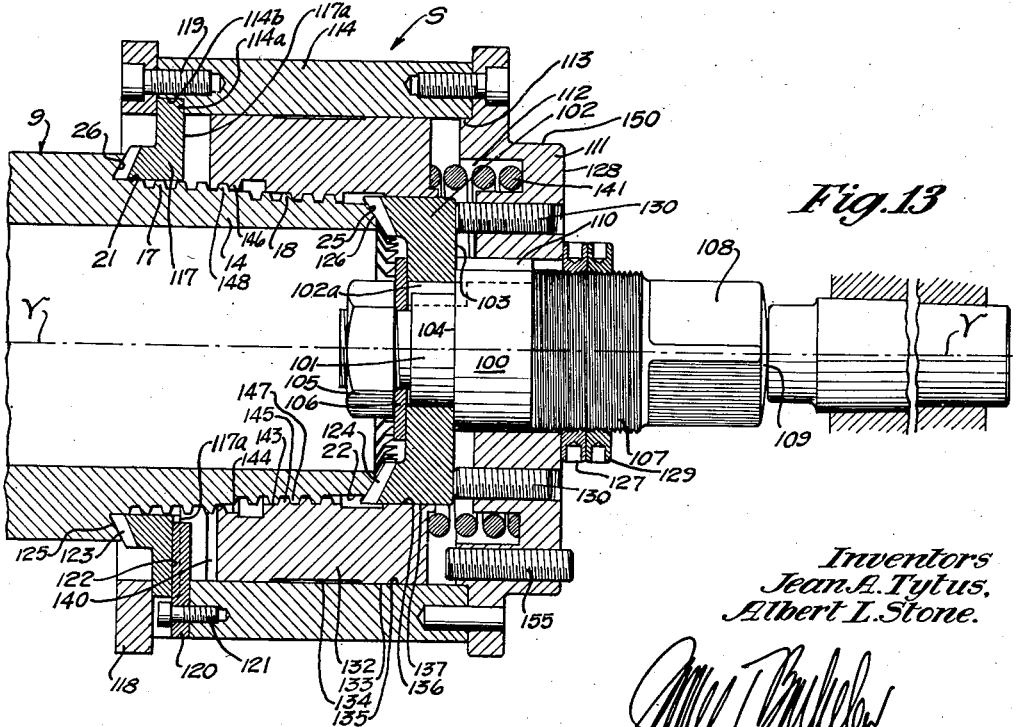
Figure 14:
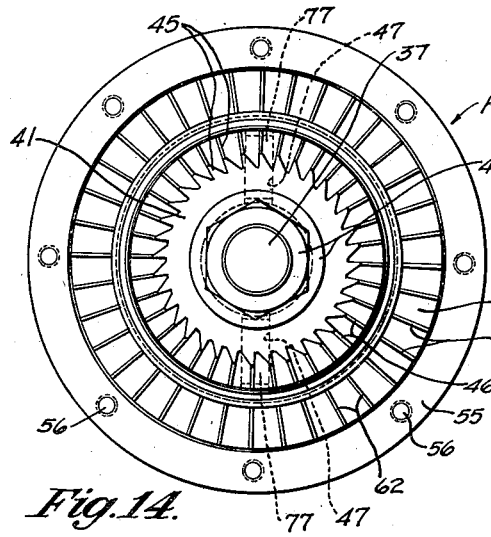
Figure 15:
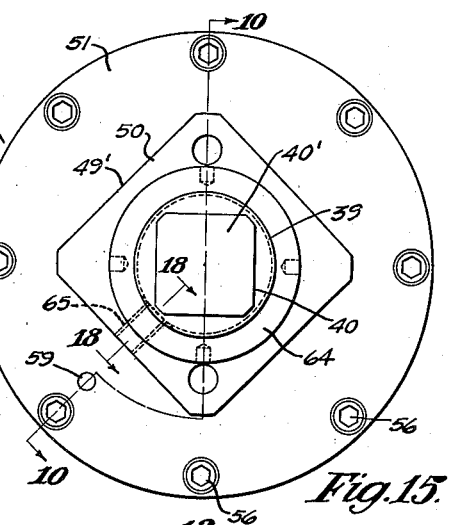
Figure 18:
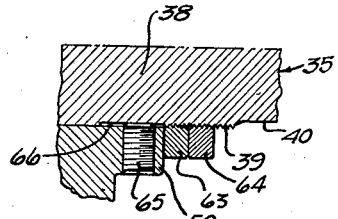
Figure 17:
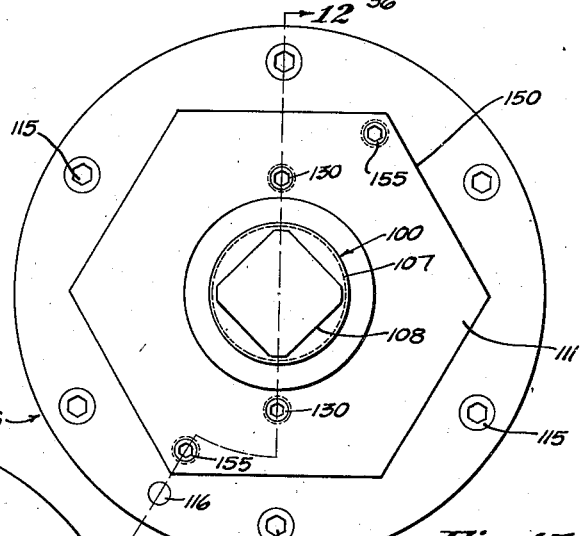
Figure 16:
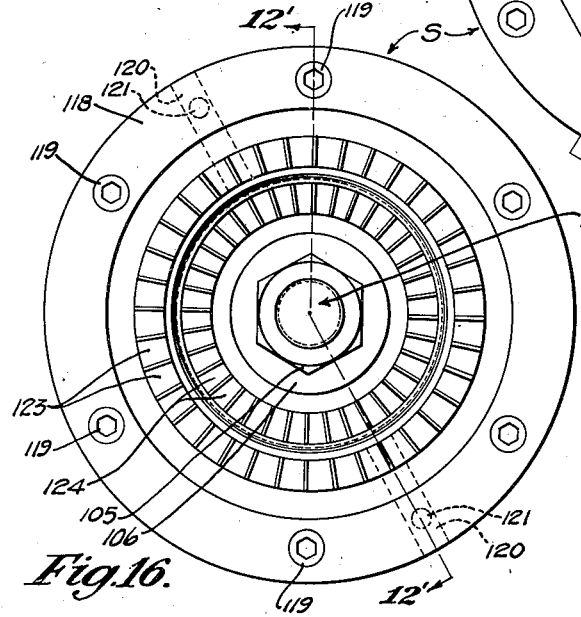

Figs. 4 to 9, inclusive, are views illustrating schematically the genesis of one of the serious problems arising in connection with reseating joints of this character which problem is solved by our invention;

Fig. 10 is a longitudinal section through an embodiment of our invention as applied to the refacing of a joint box; being taken on the broken line 10—10 of Fig. 15;

Fig. 11 is a view similar to Fig. 10, but showing the cutters in operating condition;

Fig. 12 is a longitudinal sectional view through an embodiment of our invention as applied to the reseating of the pin end of a tool joint; the right-hand portion of the view being taken on line 12—12 of Fig. 17, and the left-hand portion of the view being taken on line 12'—12' of Fig. 16;

Fig. 13 is a view similar to Fig. 12, but showing the cutters in operating condition;

Fig. 14 is an end elevation of the tool illustrated in Fig. 10, as viewed from the left thereof, and as detached from the joint-part;

Fig. 15 is a view of Fig. 10, as viewed from the right thereof;

Fig. 16 is a view of the tool shown in Fig. 12, as viewed from the left thereof, and as detached from the tool joint;

Fig. 17 is a view of the tool shown in Fig. 12, as viewed from the right thereof; and Fig. 18 is a fragmentary section on line 18—18 of Fig. 15.

The nature of the invention and the problems it has solved, may best be pointed out by reference to a particular type of joint and difficulties experienced in connection therewith, though it will be understood this reference is made subject to the reservation expressed above.

Figures 3, 4, 5:
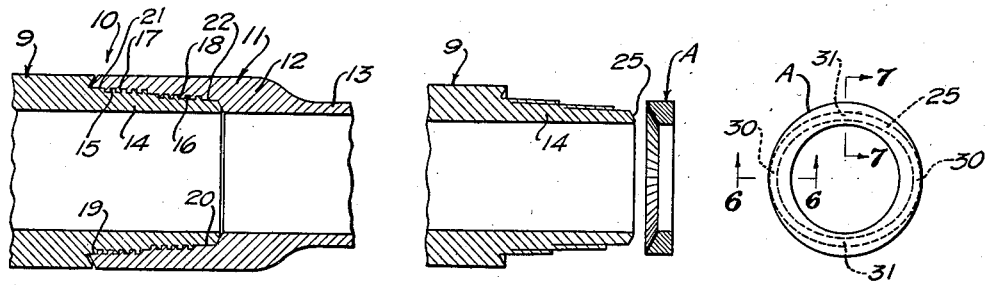
Fig. 3 shows a longitudinal section through a joint of a type particularly well adapted to be reseated by the illustrated embodiment of the invention.

In Fig. 3 is shown a pipe-joint 10 of the general nature described in Patent No. 1,932,427, issued to Frederick Stone, October 31, 1933, on "Well pipe joint." Here the box 11 of the joint is formed in the integral, upset end 12 of pipe 13, while the pin portion 14 is at one end of double-ended tool joint 9. The joint between box and pin is of the quick make-and-break type, the box and pin having mating, two-step, tapered threads. Thus, in the box, internal threads are provided on the relatively large and small tapered steps 15, 16, respectively, which threads mate with complementary external threads on the relatively large and small tapered steps 17 and 18, respectively, on pin 14. As appears clearly from the enlarged views of Figs. 10 and 12, box step 15 has an uninterrupted tapered portion at 19 and step 16 has an uninterrupted tapered portion 20, while pin steps 17 and 18 have portions 21 and 22 substantially complementary to portions 19 and 20, respectively.

Adjacent portion 20 on box 11 is an internal, annular and inclined seat or shoulder 23, while at the outer end of the box is an external, annular and oppositely inclining shoulder or seat 24; pin 14 being provided with annular shoulders or seats 25 and 26 which are complementary to seats 23 and 24, respectively. It will be seen that the specified seats all extend at an angle with respect to the transverse axial plane of the joint, or expressed otherwise, they taper toward the longitudinal axis of the joint. Therefore, for the sake of brevity, they will hereinafter be typified simply as "tapered" seats.

It is extremely important to the success of such a joint that certain relationships be very accurately created and maintained. For instance, it is highly important that the seats be true with the axis of the threaded part of the joint. Likewise, it is extremely important that the seats be so spaced, one from the other, and so related to the taper of the steps or threads, that the joints will take up in a predetermined manner. In the illustrated type of joint this shoulder-to-shoulder and shoulder-to-taper relationship is as follows. When the joint is made up "hand-tight" the tapered steps of the box and pin are fully engaged, this engagement being not only between the uninterrupted tapered portion of the steps, but also between the root faces of the pin thread and the flat apex faces of the box threads. At this time, seats 23 and 25 stand apart about $\frac{1}{32}$ of a inch, while shoulders 24 and 26 are spaced apart a slightly greater distance. Then, when predetermined tong force is applied to the joint, the threads "draw" the tapered joint parts together with wedging effect and finally bring seats 23 and 25, as well as the tapered steps, into fluid-tight engagement. (Fig. 3). But there is still left a space between shoulder 24 and 26 which is of the order of from .002 to .008 of an inch. Under more than normal torque strain, the metal of the box and pin yields (though not beyond its elastic limit) to allow the seating of shoulders 24 and 26. To bring about the above condition, it will be realized that the distance between shoulders 25 and 26 must be slightly greater than the distance between shoulders 23 and 24.

The significance and importance of the above described sequential seating is set up in the aforementioned patent, but it will be apparent that it can be secured only by very accurate machining and gauging operations.

During repeated use or making and breaking of such joints, the seats often become mutilated or otherwise deformed to an extent which greatly decreases their efficiency, or even destroys their utility. Also, it is the custom to heat-treat tool joints after machining, with the result that deformation often occurs, thus reducing or destroying the utility of the member.

In order to reface the seats, it was customary to re-chuck the defective joint part in a lathe or turning machine and then take refacing cuts thereon. This was a difficult and time-consuming task, for attempt had to be made (usually unsuccessful) to accurately re-center the joint part in the lathe, and it often resulted in the necessity of recutting the threads to restore the proper relationships between seats and threads. This rethreading was not only a difficult and time-consuming task, but also meant that the upset end of the pipe (where the defect was in the box) had to be materially reduced in length, an obvious disadvantage.

But, even with the most careful work, it was found that re-faced joints failed to fit with the required accuracy, and the problem finally reached decidedly serious proportions due to the number of joint parts that had to be discarded or put to a use where the service conditions were of less than normal severity.

After considerable research, it was discovered that the real source of the trouble was as follows.

Practically all defective joint members were out of round (either from conditions of use or as the result of heat treating) at the time they were being reseated. In Figs. 4 and 5 we have illustrated the pin portion of a tool joint as it would appear if in this condition, though the extent of deformation is greatly exaggerated for purposes of clear illustration. Here the joint is shown as flattened from top to bottom. Assuming the joint to be in such condition, it will be seen that when it was set in axial alinement with end-cutter or re-seater A, the relationship therebetween would be that illustrated in Figs. 4 to 7, inclusive, that is, the diametrically opposite side points 30 of seat 25 lay opposite points on cutter A which were spaced relatively distantly from the axis of that cutter, while the top and bottom points 31 of the seat lay opposite points which were spaced relatively close to that axis, through all points were within the radial cutting range B of the cutter.

Figures 6, 7:
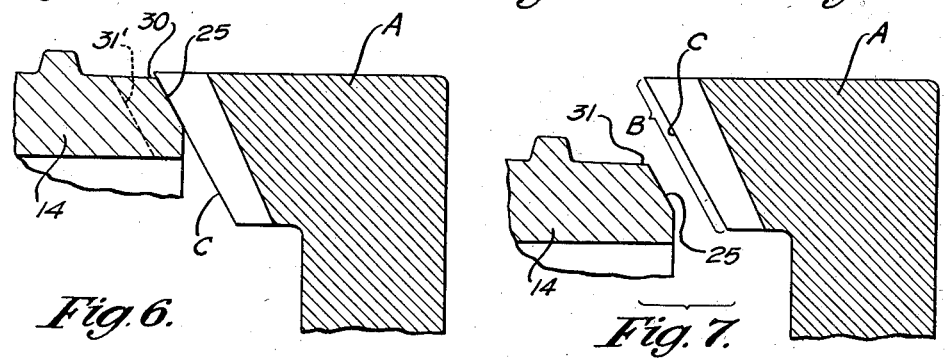
Figures 8, 9:
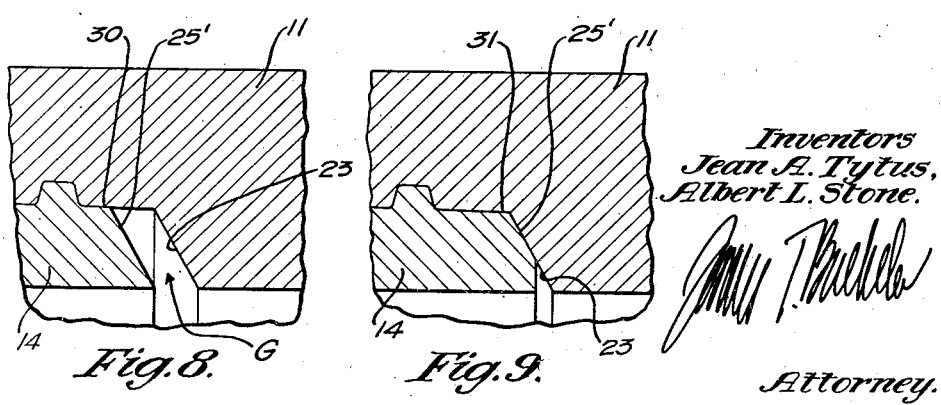

The cutting face C was disposed angularly with respect to the transverse axial plane of the cutter or, in other words, tapered in the same manner as the seats, it resulting that points 31 were more distant (measured in the direction of the cutter axis) from the directly opposite portion of the cutting face C than were points 30 from corresponding portions of the cutting face. Accordingly, when the cutter was moved axially into a position engaging seat 25 at points 30, (Fig. 6), points 31 were still spaced from that cutter (Fig. 7). Then, by the time the cutter had been moved axially a distance sufficient to take a refacing cut at points 31, it would have cut points 30 back to the extent indicated by dotted line 31' in Fig. 6. With this condition prevailing, when the tool joint 14 was subsequently threaded into connection with and brought back into round by a mating box and with refaced seat 25' at points 31 in engagement with box seat 23 (Fig. 9) a considerable gap G was left between those seats at points 30 (Fig. 8) and, of course, a gap of varying width at different points between limits 30 and 31.

It was this gap which was causing the previous unexplained leakage and general inefficiency of refaced joints, and it was to overcome this condition that the present invention was developed.

As will appear, our tool is so arranged and applied, that it draws the pipe element (whether box or pin) into round before the refacing cuts are taken, and then assures that the seats will be cut with proper relationship existing between the several seats, between the seats and the taper, and between the seats and the axis of the threaded portions of the joint parts, thus overcoming all the problems spoken of above.

The embodiment of the invention as applied to refacing of the box or internally threaded portion of the joint is indicated generally at R and is shown in detail in Figs. 10, 11, 14, 15 and 18. The tool is built up about mandrel 35 which consists of a central portion 36, a reduced-diameter and threaded terminal 37, an enlarged portion 38 which is threaded at 39, and a polygonal tool-taking stud 40, which is terminally rounded at 40'. Accurately centered on stud 37 is an end cutter 41 of centrally drilled, disk form, the inner face 42 of the cutter being held against mandrel shoulder 43 by the nut and washer assembly 44. Cutter 41 is keyed to stud 37 at 41a. The cutter teeth 45 are of the form best shown in Fig. 14, and preferably are provided in relatively large number and are of a general character which gives them a fine milling or almost a filing effect. Their cutting faces 46 are such that they will cut a tapered seat conforming accurately to the originally machined seat corresponding to 23. The rear face 42 of the cutter is provided with radially extending and diametrically opposite key-ways 47 (Fig. 14) for a purpose later to be described. Accurately centered on mandrel-portion 38 is an end cutter generally indicated at 48. The cutter is made up of a carrier or head portion 49 consisting of a hub 50 and a flange 51, the hub being keyed to the mandrel at 52, but being slidable therealong into adjusted position, as will later be made clear. The outwardly presented portion 49' of the hub is polygonal, as viewed from the end (Fig. 15).

The cutter, proper, 53 is in the form of an annulus whose inner peripheral face fits snugly about and is centered by cylindric hub-face 54, while a clamping ring 55 is bolted to flange 51 at 56, the ring having an internal flange 57 which bears against annular flange 58 in a manner to clamp the annulus in firm facial engagement with flange 51. A dowel 59 extends through flange 51 into the key-way 60 sunk in the rearward face of annulus 53, thus providing a rotary drive connection between carrier 49 and cutter annulus 53 though, of course, the clamping ring also is adapted to transmit rotary drive to the cutter annulus.

Cutter teeth 61 are generally similar to teeth 45, except, of course, they incline oppositely and are adapted to oppose the box-shoulder 24. Their cutting faces are accurately shaped and are related to the mandrel or cutter axis in a manner to produce a box shoulder which will conform accurately to that of an originally manufactured, perfect shoulder.

Internal cutter 41 and external cutter 53 are accurately centered, one with the other, through mandrel 36, and they are spaced axially of that mandrel in a manner to insure that the spacing of cutting edges 46 and 62 corresponds exactly to the spacing between seats 23 and 24 of a perfect box. The master gauges which are used in the original manufacture of joints are utilized for the purpose of setting the cutters, adjusting nut 63 being threadably adjusted along mandrel portion 38 until, with hub 50 in facial contact with that nut, faces 62 and 46 are properly spaced apart. Lock-nut 64 is then threaded against nut 63, and a set screw 65 (Figs. 15 and 18) is threaded through hub 50 and against the mandrel flat 66 to take up any slight play that may exist. It will be appreciated, however, that the inner face of nut 63 and mandrel shoulder 43 are the surfaces which establish the critical spacing of the cutters, for it is against the nut and shoulder that the cutters are pressed during the cutting operation.

Slidably and rotatably mounted on mandrel portion 36 is a plug 70 which has several functions, one of those functions being to provide for detachable connection of the tool to the work. The plug is accurately centered on mandrel portion 36 and it has a pair of accurately tapered steps 71 and 72, step 70 being adapted to fit snugly against the flat apices 73 and 74 of threads 73' and 74' on steps 16 and 15, respectively, assuming the box to be perfectly formed. At the end of plug-step 72 is a short thread 75 which is adapted to be taken within box threads 74' for the purpose of drawing the plug home within the box steps, as will later be described, the entire plug being so fashioned that when it is screwed home it will occupy the same relative position within the box as would the perfectly formed pin of a tool joint. Seated in ways 76 in the end of plug 70 are keys 77, these keys being held in position by cap screws 78 and extending beyond the end of the plug so they may be projected into key-ways 47. A compression spring 79 constantly tends to urge plug 70 to the left, as viewed in Fig. 10, and thus, when the keys 77 are alined with ways 47, to engage said keys with the cutter.

Figures 1, 2:
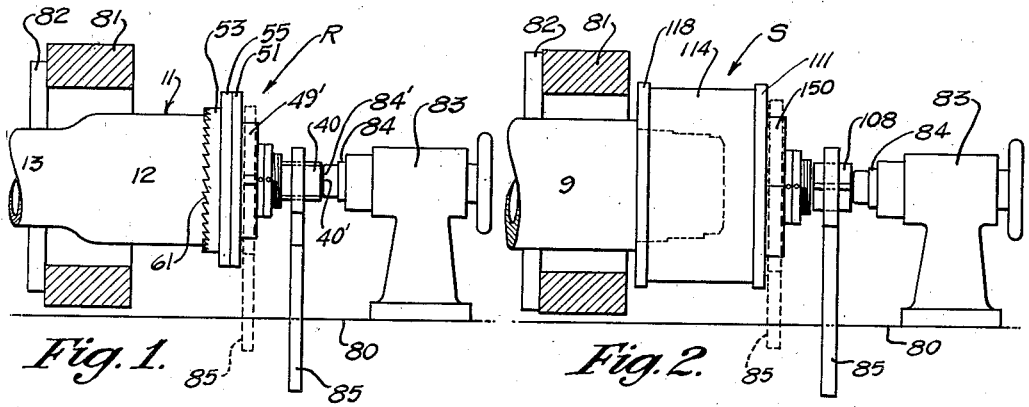
Fig. 1 illustrates schematically the application of an embodiment of our invention to the box end of a pipe-joint.
Fig. 2 shows schematically the application of an embodiment of our invention to the pin end of a pipe joint.

Now referring to Fig. 1, we have shown diagrammatically at 80 the bed of a turning machine having a turning head 81, within which pipe 13 is chucked as at 82, and a tail stock 83 carrying a tapered shank 84 having a faced end 84'. The plug 70 of the facing tool is entered in the box bore until thread 75 is in a position to engage box-threads 74'. A wrench, such as 85 in Fig. 1, is applied to stud 40 and relative rotation is set up between the work and the tool. Since keys 77 are engaged with cutter 41 due to the expansive action of spring 79, this relative rotation serves to screw the plug home. Now the plug is of such material and rigidity with relation to the material and rigidity of the box (for instance the box and plug may be of the thickness-proportion shown and the metal of the box and pin may be "medium carbon" steel while that of the plug may be tool steel) that if the box is out of round, the plug acts as an internal truing mandrel which exerts outward, radially directed force in a manner to bring the box back into round, thus contributing to the elimination of the disadvantageous effects arising from an out-of-round condition, as spoken of at the early part of the specification.

While this is not limitative on the invention, considered in its broader aspects, it will be seen that the single member 70 performs three functions, namely, (1) acts as an attachment and positioning means for the cutting tool with relation to the work (and it will be seen that the wedge-fit of the plug, entirely independently of the threads which draw it into wedge-fit, may be considered as "attaching" the tool to the work or "locating" it with respect thereto; or the threads themselves may, from some aspects, be considered as the attachment and locating means), (2) acts to true or round up the work which is out of round, and (3) since it is centered on the cutter-centering mandrel and is centered with the work, it centers the cutters with respect to the work. It will be seen that axis X—X is common to the work, the mandrel, the plug and the cutters.

With the plug threaded home, endwise pressure is exerted on stud 40, as by feeding shank 84 against that stud, this pressure shifting mandrel to the left, as viewed in Fig. 10, against the action of spring 79 and clearing ways 47 from keys 77 so that relative rotation may occur between the plug and mandrel.

With endwise pressure still maintained on the mandrel and with cutters 41 and 53 moved into cutting relation with the box (Fig. 11) the work is rotated while the mandrel and hence the cutters are held stationary, as by means of wrench 85, though in some instances we may prefer to apply the holding wrench to the polygonal portion 49'. The cutting continues by maintaining endwise pressure on stud 40, and it will be seen that due to the conditions set forth above, it will be assured that seats 23 and 24 will be refaced in proper spaced relation, one with respect to the other, and also in such manner that they fulfill all required conditions of an originally manufactured, perfect box as regards their relationship to the taper, axis and thread of the box. The extent of cut necessary to reface the seats is normally very slight, and the operation is not even started on a box unless it is assured that this extent of necessary cut will be insufficient to create an excessive spacing between box and pin seats when a subsequently inserted tool joint is wedged solidly home within the box taper.

When the refacing operation is completed or when it is desired to withdraw the tool for inspection during the reseating operation, the endwise pressure on stud 40 is relieved and spring 79 will force the mandrel and cutters to the right or back to the position of Fig. 10, thus reengaging cutter 41 with keys 77, so that relative rotation of the work and mandrel unscrews the plug from the box. If, for any reason, this key-engagement is effectively resisted, a spanner wrench 86 or equivalent tool may be inserted through bores 87 in hub 49 and into plug-sockets 88, it then being possible by manipulation of the spanner wrench to unscrew the plug.

If the box was out of round to begin with and has been rounded up during the reseating operation, it will spring back to its deformed condition as soon as the plug is removed, but this makes no difference since when it is ultimately made up with a proper tool joint, it will be forced back to round, and all shoulders will seat properly.

In Figs. 12, 13, 16 and 17, we have illustrated an embodiment of the invention, generally indicated at S, as applied to the reseating of pin shoulders. Whereas in the previously described form one of the cutters is an internal cutter and the other an external cutter, in the form now to be described both cutters are of the external type, but it is common to both forms that there are two oppositely tapering end cutters, one of lesser diameter than the other, and that these cutters are centered and spaced through their ultimate connection to a common mandrel.

In the form now to be described, mandrel 100 has a reduced-diameter portion 101 upon which end-cutter 102 is centered, the rearward face 103 of the cutter being held in facial engagement with mandrel shoulder 104 by nut 105 and washer 106. Cutter 102 is keyed to portion 101 at 102a. Mandrel 100 is threaded at 107 and has an external, polygonal shank 108 with rounded end 109. Accurately centered on mandrel 100 and keyed thereto at 110, is an annular head member 111 which has an internal, annular recess 112. Accurately centered on head 111, by way of annular shoulder 113, is a barrel 114, the attachment between head and barrel being by way of hollow-head cap screws 115 and dowel 116. Cutter annulus 117 is clamped, by ring 118 and hollow-head cap-screws 119, tightly against end shoulder 114a of barrel 114, and is held in accurately centered relation to the barrel by the peripheral face 114b of that barrel, it following from the centered relationship of the connecting parts that cutters 102 and 117 are accurately centered one with the other.

Diametrically opposite keys 120 are secured to barrel 115 by cap screws 121, these keys being taken in ways 122 provided in the inner face 117a of cutter annulus 117, thus serving to drivingly connect barrel 114 to cutter 117, it following that cutter 117 is adapted to be rotated through mandrel rotation, the drive being transmitted through the following elements; key 110, head 111, barrel 114 and key 120, or, of course, the drive from barrel to cutter may be through clamp-ring 118. Keys 120 project beyond cutter face 117a, as clearly shown in Fig. 13, for a purpose to be described. Teeth 123 on cutter 117 and teeth 125 on cutter 102 incline oppositely and are of the general nature of the teeth of tool R, though their cutting edges 125 and 126, respectively, are shaped in a manner to cut shoulders which will correspond accurately with seats 26 and 25, respectively, of an originally manufactured, perfect tool joint, as regards angle of cut, space relationship one to the other, and relationship to the joint axis Y—Y and to the thread and taper of the tool joint.

The position of cutter 102 along the axis of mandrel 100 is definitely established by the contact of face 103 with mandrel shoulder 104. On the other hand, cutter 117 may be shifted axially with respect to the mandrel to adjust the longitudinal spacing between cutters 102 and 117, by sliding head 111 along the mandrel. After the cutters have been adjusted to a position where they agree with the master gage used in spacing the equivalent cutters on the production seating device for original tool-joint manufacture, adjustment nut 127 is threaded against the rearward face 128 of head 111 to provide a positive stop, lock nut 129 then being screwed into locking position. With the proper positioning of cutter 117 thus established, hollow head set screws 130 are screwed through head 111 and into end engagement with face 103 of cutter 102, to provide backing-up means for the cutter near its outer periphery, and thus preventing the outer edge of the cutter from springing to the right (as viewed in Fig. 12) when cutting pressure is subsequently applied thereto.

Accurately centered between barrel 114 and cutter 102 is a sleeve or ring 132, the outer peripheral face 133, which may be centrally relieved as at 134, having running fit with the inner peripheral face 135 of barrel 114, and the cylindric portion 136 of the inner peripheral face of sleeve 132 having running fit with the outer cylindrical face 137 of cutter 102. Sleeve 132 is thus capable of longitudinal or axial movement with respect to mandrel 100 and all parts carried thereby, and is also, at times, capable of relative rotation with respect to that mandrel and its supported parts.

The left hand end of sleeve 132 (as viewed in Fig. 12) has diametrically opposite ways 140 which, when in register with keys 120, are adapted to take those portions of the keys which project beyond cutter face 117a. Compression spring 141 has a tendency constantly to urge sleeve 132 to the left in Fig. 12, and thus to engage keys 120 with ways 140.

The bore of sleeve 132 is provided with tapered steps 143 and 144 which correspond accurately as to size and taper with the corresponding parts of a perfect joint box, and each of these steps may be provided with a number of threads 145 and 146 adapted to mate with pin threads 147 and 148, respectively. It will be seen that with the described formation of sleeve 132 and its mounting with respect to cutters 117 and 102 and to the axis of mandrel 100, that it bears the same relationship to those cutters and axis Y—Y as do the seats on a perfect tool joint.

When tool S is applied to tool joint 9, sleeve 132 is in the position of Fig. 12, that is, keys 120 are engaged in ways 140, it resulting that when the mandrel is turned, as by application of wrench 85 to shank 108, sleeve 132 may be threaded home on the pin. The sleeve is of such thickness and rigidity with relation to the pin of the tool joint, and is made of such material (such as tool steel) that, if the pin end be out of round, it will be trued or rounded up by reason of the inward, radially directed pressure imparted through sleeve 132, it following that all the advantageous effects spoken of in connection with tool R will be had, except of course, here the truing pressure is directed radially inward, whereas in tool R the truing pressure is directed radially outward.

It will also be seen that sleeve 132 not only serves as an attachment and positioning member for the tool, but also acts to true or round up a radially deformed pin and to aid in centering the cutters 102 and 117, one with the other, it being noted in this last connection that since cutter 117 is true with barrel 114 and sleeve 132 is true with that same barrel, the cylindrical portion 137 of the sleeve bore in its running engagement with the cylindrical peripheral face 136 of cutter 102 assures the centering of the two cutters, one with the other.

After sleeve 132 has been threaded home on the tool joint, (in which condition axis Y—Y is common to the work, cutters, sleeve and mandrel) endwise pressure is applied thereto by tail-stock shank 84, as described in connection with Fig. 1, which shifts the cutters to the left, as viewed in Fig. 12, to the position shown in Fig. 13, thus clearing keys 120 from ways 140 so relative rotation may be set up between the cutters and sleeve 132. Then, while endwise pressure is maintained on the mandrel, the work is rotated and mandrel 103 (and hence cutters 102 and 117) are held stationary by the application of wrench 85 either to shank 108 or to the polygonal hub 150 (Fig. 17) on head 111.

Cutters 102 and 117 are thus brought into action to reface seats 25 and 26, respectively, with the assurance that those refaced seats are accurately spaced, are true with the axis of the threaded part of the joint, and are properly located with respect to the taper of the pin-steps and to the thread.

When it is desired to remove tool S, either for inspection between cuts or upon completion of the refacing operation, the endwise pressure is relieved on mandrel 100, whereupon spring 141 returns the cutter and mandrel assembly to the position of Fig. 12, thus reengaging keys 120 in ways 140 so that subsequent rotation of the mandrel will unscrew sleeve 132 from the tool joint pin.

If for some reason spring 141 is unable to shift the mandrel and cutter assembly in the described manner, jack-screws 155 are threaded through head 111 into engagement with sleeve 132, whereupon continued operation of the jack-screws will positively shift the cutter and mandrel assembly to the right, as viewed in Fig. 13, and thus positively engage keys 120 in ways 140, assuming, of course, cutter 117 is rotated to a position registering the keys and ways.

When the tool is removed from the refaced pin, said pin will spring back into an out-of-round condition, but it is pulled back into round by subsequent application thereto of a proper box member, and the seating will be that of a perfect, original joint.

With the arrangement described, it will be noted that it is not essential either that the joint part upon which the work is being done be accurately centered within work-head 81 nor that the mandrel run exactly true with respect to shank 84, for the centering of both cutters with respect to the work is done by direct application of the tool, as a whole, to the work. It is because the mandrel and shank 84 may not be exactly alined that the outer ends of the mandrels are rounded as at 40' and 109, this rounding permitting the slight gyratory movement which will occur between mandrel and shank in case they are misalined.

It will be apparent from the above that we have provided a tool which is adapted to be applied to the work with ease and dispatch, and with the assurance that the ultimate result of the operation will restore the work to a condition allowing it to perform with full efficiency, thus overcoming the serious problems which have heretofore gone unsolved. It will be understood that while we have illustrated and described preferred embodiments of our invention, various changes in design, structure and arrangement may be made without departing from the spirit and scope of the appended claims.

We claim:

1. In a tool for refacing an annular seat on radially deformable pipe and adjacent a tapered threaded portion of the pipe, which seat tapers with respect to the pipe-axis, that includes a radially rigid attachment member having a tapered peripheral face adapted to engage the peripheral faces of the pipe threads, said member being operable to apply radially directed pressure against the pipe to draw it into concentric relation thereto and into round, and a tapered end-cutter mounted in coaxial and rotatable relation with the member and movable axially thereof toward and away from the seat.

2. In a tool for refacing an annular seat on radially deformable pipe and adjacent a tapered threaded portion of the pipe, which seat tapers with respect to the pipe-axis, that includes an attachment member having a thread for threadably connecting it to the pipe thread and having a tapered peripheral face adapted to engage the peripheral faces of the pipe threads, said member being operable to apply radially directed pressure against the pipe to draw it into concentric relation thereto and into round, a tapered end-cutter mounted in coaxial and rotatable relation with the member and movable axially thereof toward and away from the seat, releasable means for holding the member and cutter against relative rotation, and yielding means adapted to hold the releasable means in holding condition.

3. In a tool for refacing a pair of annular seats spaced apart axially of a radially deformable pipe, said seats being of different diameters and one, at least, tapering with respect to the pipe-axis; that includes an attachment member having a peripheral face adapted to engage a peripheral face of the pipe at a point intermediate the seats, said member being operable to apply radially directed pressure against the pipe to draw it into concentric relation thereto and into round, means releasably holding said member against rotation and axial movement with respect to the pipe when the member has been so operated, and a pair of axially spaced cutters, one for each of the seats, mounted in coaxial and rotatable relation with the member and connected for axial movement towards and away from said seats while the member is so held.

4. In a tool for refacing a pair of annular seats spaced apart axially of a radially deformable pipe, said seats being of different diameters and one, at least, tapering with respect to the pipe-axis; that includes an attachment member having a peripheral face adapted to engage a peripheral face of the pipe at a point intermediate the seats, said member being operable to apply radially directed pressure against the pipe to draw it into concentric relation thereto and into round, a pair of axially spaced cutters, one for each of the seats, mounted in coaxial and rotatable relation with the member and connected for axial movement towards and away from said seats, and means for adjusting one cutter with respect to the other to vary the axial spacing therebetween.

5. In a tool for refacing a pair of annular seats spaced apart axially of a radially deformable pipe, said seats being of different diameters and one, at least, tapering with respect to the pipe-axis; that includes an attachment member having a peripheral face adapted to engage a peripheral face of the pipe at a point intermediate the seats, said member being operable to apply radially directed pressure against the pipe to draw it into concentric relation thereto and into round, a pair of axially spaced cutters, one for each of the seats, mounted in coaxial and rotatable relation with the member and connected for axial movement towards and away from said seats, and selectively operable releasable means for holding the member and one of the cutters against relative rotation.

6. In a tool of the character described, a mandrel, a pair of axially spaced cutters concentrically supported by the mandrel for axial and rotative movement therewith, and an attachment member between the cutters and held in concentric relation thereto, said member and mandrel being realtively axially and rotatably movable.

7. In a tool of the character described, a mandrel, a pair of axially spaced cutters concentrically supported by the mandrel for axial and rotative movement therewith, and an attachment member between the cutters and held in concentric relation thereto, said member and mandrel being relatively axially and rotatably movable, said attachment member having a peripheral work-taking face.

8. In a tool of the character described, a mandrel, a pair of axially spaced cutters concentrically supported by the mandrel for axial and rotative movement therewith, and an attachment member between the cutters and held in concentric relation thereto, said member and mandrel being relatively axially and rotatably movable, said attachment member having a tapered peripheral work-taking face.

9. In a tool of the character described, a mandrel, a pair of axially spaced cutters concentrically supported by the mandrel for axial and rotative movement therewith, and an attachment member between the cutters and held in concentric relation thereto, said member and mandrel being relatively axially and rotatably movable, said attachment member having a threaded peripheral work-taking face.

10. In a tool of the character described, a mandrel, a pair of axially spaced cutters concentrically supported by the mandrel for axial and rotative movement therewith, and an attachment member between the cutters and held in concentric relation thereto, said member and mandrel being relatively axially and rotatably movable, said attachment member having a tapered and threaded peripheral work-taking face.

11. In a tool of the character described, a mandrel, a pair of axially spaced cutters concentrically supported by the mandrel for coincident axial and rotative movement therewith, one of said cutters being adjustable axially toward and away from the other cutter, and an attachment member between the cutters and held in concentric relation thereto, said member and mandrel being relatively axially and rotatably movable.

12. In a tool of the character described, a mandrel, a pair of axially spaced cutters concentrically supported by the mandrel for axial and rotative movement therewith, an attachment member between the cutters and held in concentric relation thereto, said member and mandrel being normally relatively axially and rotatably movable, and a releasable connection between the mandrel and member for holding them against relative rotation.

13. In a tool of the character described, a mandrel, a pair of cutters held non-rotatably in spaced relation on the mandrel and in concentric relation thereto, and an externally tapered cone concentrically and rotatably mounted on said mandrel between the cutters, said cone being movable axially of the mandrel between limits.

14. In a tool of the character described, a mandrel, a pair of cutters held non-rotatably in spaced relation on the mandrel and in concentric relation thereto, an externally tapered cone concentrically and rotatably mounted on said mandrel between the cutters, said cone being movable axially of the mandrel between limits, and a key adapted to interengage the mandrel and cone to prevent their relative rotation when the cone is at one of its limits of axial movement.

15. In a tool of the character described, a mandrel, a pair of cutters held non-rotatably in spaced relation on the mandrel and in concentric relation thereto, an externally tapered cone concentrically and rotatably mounted on said mandrel between the cutters, said cone being movable axially of the mandrel between limits, a key adapted to interengage the mandrel and cone to prevent their relative rotation when the cone is at one of its limits of axial movement, and spring means adapted to urge said cone toward said one limit.

16. In a tool of the character described, a mandrel, a pair of cutters held non-rotatably in spaced relation on the mandrel and in concentric relation thereto, and an externally threaded and tapered cone concentrically and rotatably mounted on said mandrel between the cutters, said cone being movable axially of the mandrel between limits.

17. In a tool of the character described, a mandrel, a cutter concentrically fixed on the mandrel for rotation thereby, a head fixed to the mandrel at one side of the cutter, a barrel extending from said head in concentric, annularly spaced relation to the cutter and with one end extending therebeyond, an annular cutter on said one end of the barrel and in concentric relation thereto, and a sleeve concentrically arranged within the barrel bore, said sleeve being normally rotatable with respect to the barrel and cutters and being movable axially with respect thereto between limits.

18. In a tool of the character described, a mandrel, a cutter concentrically fixed on the mandrel for rotation thereby, a head fixed to the mandrel at one side of the cutter, a barrel extending from said head in concentric, annularly spaced relation to the cutter and with one end extending therebeyond, an annular cutter on said one end of the barrel and in concentric relation thereto, and a sleeve concentrically arranged within the barrel bore, said sleeve being normally rotatable with respect to the barrel and cutters and being movable axially with respect thereto between limits, said sleeve having a tapering bore.

19. In a tool of the character described, a mandrel, a cutter concentrically fixed on the mandrel for rotation thereby, a head fixed to the mandrel at one side of the cutter, a barrel extending from said head in concentric, annularly spaced relation to the cutter and with one end extending therebeyond, an annular cutter on said one end of the barrel and in concentric relation thereto, and a sleeve concentrically arranged within the barrel bore, said sleeve being normally rotatable with respect to the barrel and cutters and being movable axially with respect thereto between limits, said sleeve having a tapering and threaded bore.

20. In a tool of the character described, a mandrel, a cutter concentrically fixed on the mandrel for rotation thereby, a head fixed to the mandrel at one side of the cutter, a barrel extending from said head in concentric, annularly spaced relation to the cutter and with one end extending therebeyond, an annular cutter on said one end of the barrel and in concentric relation thereto, a sleeve concentrically arranged within the barrel bore, said sleeve being normally rotatable with respect to the barrel and cutters and being movable axially with respect thereto between limits, and a key adapted to interengage the annular cutter and sleeve to prevent their relative rotation when the sleeve is at one of its limits of axial movement.

21. In a tool of the character described, a mandrel, a cutter concentrically fixed on the mandrel for rotation thereby, a head fixed to the mandrel at one side of the cutter, a barrel extending from said head in concentric, annularly spaced relation to the cutter and with one end extending therebeyond, an annular cutter on said one end of the barrel and in concentric relation thereto, a sleeve concentrically arranged within the barrel bore, said sleeve being normally rotatable with respect to the barrel and cutters and being movable axially with respect thereto between limits, a key adapted to interengage the annular cutter and sleeve to prevent their relative rotation when the sleeve is at one of its limits of axial movement, and a spring adapted yieldingly to urge the sleeve towards said one limit.

22. In a tool of the character described, a mandrel, a cutter concentrically fixed on the mandrel for rotation thereby, a head fixed to the mandrel at one side of the cutter, a barrel extending from said head in concentric, annularly spaced relation to the cutter and with one end extending therebeyond, an annular cutter on said one end of the barrel and in concentric relation thereto, a sleeve concentrically arranged within the barrel bore, said sleeve being normally rotatable with respect to the barrel and cutters and being movable axially with respect thereto between limits, and a jack-screw threaded through said head and engageable with the first mentioned cutter.

23. In a tool of the character described, a mandrel, an end cutter concentric with and held non-rotatably on said mandrel, an externally tapered cone concentrically and rotatably mounted on said mandrel near said cutter, said cone being movable longitudinally axially of the mandrel, and a key adapted to interengage the mandrel and cone when the cone is moved axially of the mandrel to a given position.

24. In a tool of the character described, a mandrel, a head fixed to the mandrel, a barrel fixed at one end to and extending from said head in concentric relation to the mandrel, an annular cutter near the distant end of the barrel, and a sleeve concentrically arranged within the barrel bore, said sleeve being normally rotatable with respect to the barrel and cutter and being movable axially with respect thereto.

25. In a tool of the character described, a mandrel, a head fixed to the mandrel, a barrel fixed at one end to and extending from said head in concentric relation to the mandrel, an annular cutter near the distal end of the barrel, and a sleeve concentrically arranged within the barrel bore, said sleeve being normally rotatable with respect to the barrel and cutter and being movable axially with respect thereto, said sleeve having a tapering bore.

26. In a tool of the character described, a mandrel, a head fixed to the mandrel, a barrel fixed at one end to and extending from said head in concentric relation to the mandrel, an annular cutter near the distal end of the barrel, and a sleeve concentrically arranged within the barrel bore, said sleeve being normally rotatable with respect to the barrel and cutter and being movable axially with respect thereto, said sleeve having a tapering and threaded bore.

27. In a tool of the character described, a mandrel, a head fixed to the mandrel, a barrel fixed at one end to and extending from said head in concentric relation to the mandrel, an annular cutter near the distal end of the barrel, a sleeve concentrically arranged within the barrel bore, said sleeve being normally rotatable with respect to the barrel and cutter and being movable axially with respect thereto, and a key adapted to engage the annular cutter and sleeve to prevent their relative rotation when the sleeve is in a selected position lengthwise of the mandrel.

28. In a tool of the character described, a mandrel, a head fixed to the mandrel, a barrel fixed at one end to and extending from said head in concentric relation to the mandrel, an annular cutter near the distant end of the barrel, a sleeve concentrically arranged within the barrel bore, said sleeve being normally rotatable with respect to the barrel and cutter and being movable axially with respect thereto, a key adapted to engage the annular cutter and sleeve to prevent their relative rotation when the sleeve is in a selected position lengthwise of the mandrel, and a spring adapted yieldingly to urge said sleeve into said selected position.

29. In a tool of the character described, a barrel having an annular cutter near one end thereof, a sleeve within the barrel bore, said barrel, cutter and sleeve being supported in coaxial relation, and said sleeve and barrel being normally freely relatively rotatable and axially movable.

30. In a tool of the character described, a barrel having an annular cutter near one end thereof, a sleeve within the barrel bore, said barrel, cutter and sleeve being supported in coaxial relation, and said sleeve and barrel being normally freely relatively rotatable and axially movable, and said sleeve having a tapering bore.

31. In a tool of the character described, a barrel having an annular cutter near one end thereof, a sleeve within the barrel bore, said barrel, cutter and sleeve being supported in coaxial relation, and said sleeve and barrel being normally freely relatively rotatable and axially movable, and said sleeve having a tapering and threaded bore.

JEAN A. TYTUS.
ALBERT L. STONE.

CERTIFICATE OF CORRECTION.

Patent No. 2,211,183. August 13, 1940.

JEAN A. TYTUS, ET AL.

It is hereby certified that error appears in the printed specification of the above numbered patent requiring correction as follows: Page 7, second column, lines 19 and 61, claims 24 and 28 respectively, for the word "distant" read --distal--; and that the said Letters Patent should be read with this correction therein that the same may conform to the record of the case in the Patent Office.

Signed and sealed this 24th day of September, A. D. 1940.

(Seal)

Henry Van Arsdale,
Acting Commissioner of Patents.